US006180264B1

(12) United States Patent
Takaoka et al.

(10) Patent No.: US 6,180,264 B1
(45) Date of Patent: Jan. 30, 2001

(54) SOLDERED ARTICLE

(75) Inventors: Hidekiyo Takaoka, Shiga-ken; Kunihiko Hamada, Kyoto; Yu Tokuda, Otsu, all of (JP)

(73) Assignee: Murata Manufacturing Co., Ltd. (JP)

( * ) Notice: Under 35 U.S.C. 154(b), the term of this patent shall be extended for 0 days.

(21) Appl. No.: 09/396,819

(22) Filed: Sep. 14, 1999

(30) Foreign Application Priority Data

Sep. 14, 1998 (JP) .................................................. 10-279357
Aug. 10, 1999 (JP) .................................................. 11-226682

(51) Int. Cl.$^7$ ...................................................... B32B 15/01
(52) U.S. Cl. .......................... 428/646; 174/263; 257/772; 420/557; 420/561; 420/562; 428/647
(58) Field of Search ..................................... 428/646, 647; 420/557, 559, 561, 562; 174/263; 257/772

(56) References Cited

U.S. PATENT DOCUMENTS

| 4,879,096 | 11/1989 | Naton | ................................... | 420/561 |
| 5,393,489 | * 2/1995 | Gonya et al. | ......................... | 420/561 |
| 5,411,703 | * 5/1995 | Gonya et al. | ......................... | 420/561 |
| 5,527,628 | * 6/1996 | Anderson et al. | ..................... | 428/647 |
| 5,837,191 | * 11/1998 | Gickler | ................................. | 420/561 |
| 5,863,493 | * 1/1999 | Achari et al. | ......................... | 420/557 |

FOREIGN PATENT DOCUMENTS

| 0336575 | 10/1989 | (EP) . |
| 0629464A1 | 12/1994 | (EP) . |

* cited by examiner

*Primary Examiner*—John J. Zimmerman
*Assistant Examiner*—Robert R. Koehler
(74) *Attorney, Agent, or Firm*—Ostrolenk, Faber, Gerb & Soffen, LLP

(57) ABSTRACT

There is provided a soldered article comprising a component having a Cu conductor joined with a solder, wherein the solder comprises about 0.1 to 2.0% by weight of Cu, about 1.0 to 7.5% by weight of Bi, and the balance being Sn. By using the above described lead-free solder, the occurrence of leaching is suppressed during soldering, and the solderability and joining strength can be improved. Since the solder does not contain Ag, material cost can be reduced, thus enabling reductions in the cost of the entire soldered article.

14 Claims, 1 Drawing Sheet

SOLDERED ARTICLE

BACKGROUND OF THE INVENTION

1. Field of the Invention

Figure 1:
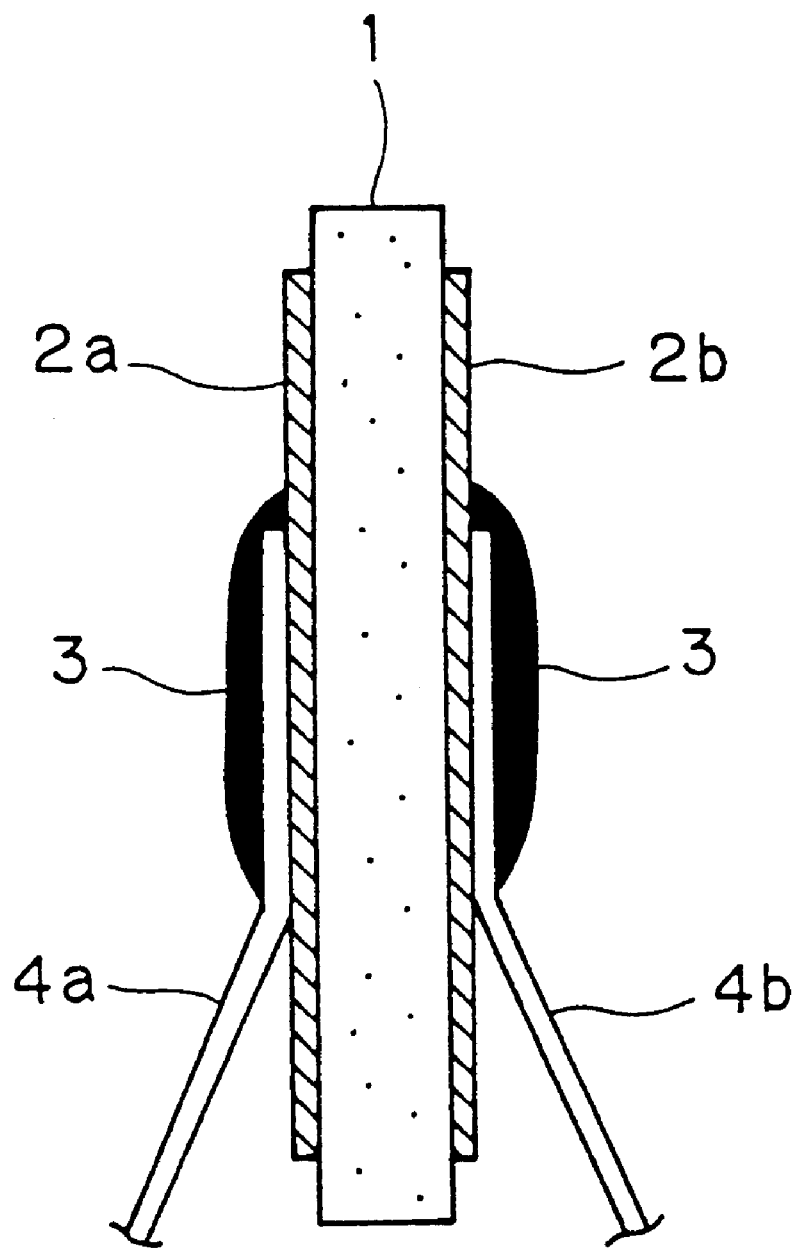

The present invention relates to soldered articles, and more particularly, the invention relates to a soldered article including a component having a Cu conductor joined with a solder.

2. Description of the Related Art

Solders have been widely used as jointing materials for achieving electrical and mechanical connections in electronic equipment and electronic components.

On the other hand, as a material for constituting electrodes in electronic equipment and electronic components, Cu has been widely used in view of its corrosion resistance, costs, etc.

Soldered articles in which the electrodes composed of Cu are joined to objects (for example, lands on mounting substrates) have been widely used for various applications.

Although solders having Sn and Pb as major constituents have generally been used, in consideration of environmental protection, solders having Sn as a major constituent, and excluding hazardous Pb, (hereinafter referred to as "lead-free solders") have come into use.

However, in a soldered article in which electrodes composed of Cu are joined to a mount object using a lead-free solder having Sn as a major constituent, leaching easily occurs at the electrical junction during soldering.

In comparison with the case when conventional Sn—Pb based solders are used, lead-free solders having Sn as a major constituent are inferior in solderability and joining strength at soldered sections, and are less reliable.

In order to overcome the problems described above, Sn—Cu—Bi-based solders containing Ag have been disclosed (for example, Japanese Unexamined Patent Publication Nos. 2-70033, 5-228685, and 8-132277). However, the solders in the above patent publications contain Ag, resulting in an increased cost.

SUMMARY OF THE INVENTION

To overcome the difficulties noted above, preferred embodiments of the present invention provide a soldered article using a solder which does not easily cause leaching, which has excellent solderability and joining strength, and which does not contain expensive Ag, thus being very economical.

One preferred embodiment of the present invention provides a soldered article comprising a component having a Cu conductor joined with a solder, wherein the solder comprises about 0.1 to 2.0% by weight of Cu, about 1.0 to 7.5% by weight of Bi, and the balance being Sn.

When a Cu conductor is joined to an object such as an electrode using the solder containing about 0.1 to 2.0% by weight of Cu, about 1.0 to 7.5% by weight of Bi, and the balance being Sn as described above, the occurrence of leaching is suppressed during soldering, and the solderability and joining strength can be improved. Since the solder does not contain Ag, material cost can be reduced, thus enabling reductions in the cost of the entire soldered article.

Since the lead-free solder used in the soldered article in the present invention does not contain Ag, rigid intermetallic compounds such as $Ag_3Sn$ are not produced, and the processing into wire solders or the like can be easily performed in comparison with lead-free solders containing Ag. The thermal shock resistance of the soldered article can also be improved.

In the present invention, the Cu conductors include sheet or linear Cu conductors in addition to metal Cu thin films such as plated films, deposited films, and sputtered films in which leaching due to solders easily occurs, and also include Cu conductors in which glass frit and various additives are added, as required.

The soldered articles in the present invention include, for example, the followings.

1) A soldered article in which a conductor provided in a component is electrically and mechanically connected to an electrode on a printed board with a solder.
2) A soldered article in which a conductor provided in an electronic component is electrically and mechanically connected to an external terminal with a solder.
3) A soldered article in which electrodes (Cu conductors) of an electronic component are electrically and mechanically connected to each other with a solder.

As is clear from the above, the concept of the soldered articles in the present invention is broad, including various articles in which conductors provided in components are joined to object conductors with solders.

FIG. 1 shows a single-sheet capacitor which is a typical soldered article. In the single-sheet capacitor, a sheet dielectric material 1 is provided with electrodes 2a and 2b for forming capacity on the front and back surfaces, respectively, and lead terminals 4a and 4b are electrically and mechanically connected to the electrodes 2a and 2b, respectively, with a solder 3.

Examples of the substrate for mounting an electronic component are printed boards composed of a glass fabric based epoxy resin or a phenolic resin, ceramic-based substrate such as alumina, and a substrate made of a metal provided with an insulating film on the surface.

Examples of the conductor to be joined with a solder are a wiring circuit of a printed board, a terminal electrode of an electronic component, and a lead terminal.

A soldered article in accordance with the present invention can be easily fabricated, for example, by working a solder in which Cu and Bi are dissolved in Sn as a major constituent into a ball, and after a flux is applied to the solder ball placed on a Cu conductor of an electronic component, and heated to a given temperature in air to join to a conductor such as an external terminal.

In the above described soldered article, the solder may further contain a trace amount of additives for improving characteristics.

In a soldered article of the present invention, a solder may contain a trace amount of additives for improving characteristics (for example, Ge, P, Ga and the like for inhibiting oxidation) in addition to the compositions described above. In such a case, the same effect as the above described soldered article can be obtained, and characteristics such as oxidation resistance can also be improved, thus enhancing the effectiveness of the present invention.

A solder may also contain incidental impurities. The incidental impurities may include an element that is mixed in the production process of the solder or an element originally contained in the composition of the solder, such as Pb, Cu, Zn or Na.

In the above described soldered article, the Cu content in the solder is preferably in the range from about 0.5 to 1.3% by weight. By setting the Cu content in the solder in the range from about 0.5 to 1.3% by weight, the occurrence of leaching can be suppressed more securely and the solderability and joining strength can be improved, thus enhancing the effectiveness of the present invention.

In the above described soldered article, the Bi content in the solder is preferably in the range from about 1.0 to 3.0% by weight. By setting the Bi content in the solder in the range from about 1.0 to 3.0% by weight, the occurrence of leaching can be suppressed more securely and the solderability and joining strength can be improved, thus enhancing the effectiveness of the present invention.

DESCRIPTION OF THE PREFERRED EMBODIMENTS

The preferred embodiments of the present invention will be shown and the characteristics thereof will be described in more detail.

By mixing materials such as Sn, Pb, Cu and Bi according to the compositions shown in Table 1, solders of examples 1 to 8 in Table 1 were produced.

For comparison, solders of comparative examples 1 to 4 having compositions outside the ranges specified in the present invention were prepared.

TABLE 1

| | Composition (weight %) | | | | |
|---|---|---|---|---|---|
| | Sn | Pb | Cu | Bi | Ag |
| Example 1 | 98.3 | — | 0.7 | 1.0 | — |
| Example 2 | 96.3 | — | 0.7 | 3.0 | — |
| Example 3 | 94.3 | — | 0.7 | 5.0 | — |
| Example 4 | 91.8 | — | 0.7 | 7.5 | — |
| Example 5 | 96.9 | — | 0.1 | 3.0 | — |
| Example 6 | 96.5 | — | 0.5 | 3.0 | — |
| Example 7 | 95.7 | — | 1.3 | 3.0 | — |
| Example 8 | 95.0 | — | 2.0 | 3.0 | — |
| Comparative Example 1 | 99.3 | — | 0.7 | — | — |
| Comparative Example 2 | 96.5 | — | — | — | 3.5 |
| Comparative Example 3 | 87.0 | — | 3.0 | 10.0 | — |
| Comparative Example 4 | 60.0 | 40.0 | — | — | — |
| Comparative Example 5 | 96.2 | — | 0.7 | 3.0 | 0.1 |
| Comparative Example 6 | 91.3 | — | 0.7 | 3.0 | 5.0 |

With respect to the solders of examples 1 to 8 and comparative examples 1 to 6 in Table 1, the leaching ratio during soldering, solderability, and joining strength were observed by the methods described below.

Leaching Ratio

A Cu electrode (Cu-plated electrode) was formed on each surface of a dielectric material having a diameter of 5 mm and a thickness of 0.5 mm to fabricate a single-sheet capacitor. The single-sheet capacitor was dipped in a molten solder at a temperature (evaluation temperature) as shown in Table 2, and the remaining rate of the Cu electrodes were calculated based on a change in the electrostatic capacity before and after dipping. That is, when the area of the electrodes is decreased due to leaching, the electrostatic capacity decreases in proportion to the area of the electrodes, and by taking this fact into account, the leaching ratio (decreasing rate of the electrode area) was evaluated.

Solderability

In accordance with JISZ3197, the solder spread ratio was investigated, and thus the solderability was evaluated. The evaluation temperature was set at the same as that in the evaluation of the leaching ratio.

Joining Strength

A Cu sheet sandwiched between hot-dip Sn-coated Cu leads was dipped in a molten solder to perform soldering. Using this as a sample, the Cu leads were pulled with a tensile tester to find maximum tensile strength. The dip soldering temperature was set at the same as that in the evaluation of the leaching ratio.

Characteristics Evaluation

The measurement results of the above characteristics are shown in Table 2.

TABLE 2

| | Leaching Ratio (%) | Solderability (%) | Evaluation Temperature (%) | Joining Strength (kgf) |
|---|---|---|---|---|
| Example 1 | 89.5 | 72 | 260 | 19.7 |
| Example 2 | 90.0 | 74 | 260 | 17.8 |
| Example 3 | 91.8 | 75 | 260 | 17.1 |
| Example 4 | 93.2 | 77 | 260 | 15.2 |
| Example 5 | 89.4 | 74 | 260 | 16.3 |
| Example 6 | 90.2 | 74 | 260 | 17.5 |
| Example 7 | 93.1 | 76 | 290 | 17.1 |
| Example 8 | 94.3 | 79 | 330 | 15.2 |
| Comparative Example 1 | 92.5 | 70 | 260 | 20.5 |
| Comparative Example 2 | 79.2 | 70 | 250 | 21.3 |
| Comparative Example 3 | 93.5 | 78 | 360 | 9.4 |
| Comparative Example 4 | 98.6 | 84 | 230 | 17.3 |
| Comparative Example 5 | 89.9 | 74 | 260 | 17.7 |
| Comparative Example 6 | 89.5 | 76 | 260 | 15.3 |

With respect to the comparative example 1, which is a typical conventional lead-free solder, although the remaining rate of the Cu electrodes (the value of the leaching ratio shown in Table 2) is high at 92.5% and the joining strength is high at 20.5 kgf, the solder spread ratio is low at 70%, and thus the solderability is insufficient.

With respect to the comparative example 2, which is a typical conventional lead-free solder although the joining strength is high at 21.3 kgf, the remaining rate of the Cu electrodes is low at 79.2%, and thus the leaching resistance is insufficient. Since the solder spread ratio is also low at 70%, the solderability is insufficient.

With respect to comparative example 3, which has a higher Cu content as well as a higher Bi content compared with the composition ranges specified in the present invention, the remaining rate of the Cu electrodes is high at 93.5%, thus exhibiting excellent leaching resistance, and the solder spread ratio is high at 78%, thus exhibiting satisfactory solderability. However, the joining strength is low at 9.4 kgf, and thus the joining strength is insufficient.

Comparative example 4 shows the characteristics of a Sn—Pb-based solder for reference purposes, and satisfactory results are obtained in leaching resistance, solder spread ratio (solderability) and joining strength.

Comparative example 5 and 6 are Sn—Cu—Bi based solder containing Ag, and satisfactory results are obtained in leaching resistance, solder spread ratio (solderability) and joining strength. However, there is a problem that the cost is high because they contain Ag.

In contrast, with respect to the solders of examples 1 to 8, in which the compositions are in the range specified in the present invention, although Pb is not present, satisfactory results are obtained in leaching resistance, solder spread ratio (solderability), and joining strength.

The solders of examples 1 to 8, in which the compositions are in the range specified in the present invention, have characteristics like lead-free solder containing Ag (comparative example 5 and 6) in spite of the fact that they are lead-free solders which do not contain Ag.

In example 4, the Bi content is high at 7.5% by weight, which reaches the upper limit of the composition range. Since Bi separates as crystals, although the solder can be used satisfactorily depending on conditions, the joining strength is slightly low. Therefore, the Bi content is preferably set in the range from about 1.0 to 3.0% by weight, if possible.

With respect to example 5, since the Cu content is low at 0.1% by weight, the effect of joining strength improvement by Cu is decreased. Although the solder can be used satisfactorily depending on conditions, the joining strength is slightly low.

With respect to example 8, the joining strength is slightly decreased. The reason for this is that the Cu content is high at 2.0% by weight, and an intermetallic compound $Cu_6Sn_5$ is believed to be thickly deposited at the joined interface.

Therefore, the Cu content is preferably set in the range from 0.5 to 1.3% by weight, if possible.

With respect to examples 7 and 8, the solder spread ratio is slightly increased in comparison with examples 1 to 6. This is believed to be influenced by the increased soldering temperatures due to the increased liquidus temperatures.

The present invention is not limited to the examples described above, and various applications and modifications can be made within the spirit and scope of the invention.

What is claimed is:

1. A soldered article comprising a component having a Cu conductor joined with a solder,
   wherein the solder is silver-free and consists essentially of about 0.1 to 2.0% by weight of Cu, about 1.0 to 7.5% by weight of Bi, and the balance being Sn.

2. A soldered article according to claim 1, wherein the Cu content in the solder is in the range from about 0.5 to 1.3% by weight.

3. A soldered article according to claim 1, wherein the Bi content in the solder is in the range from about 1.0 to 3.0% by weight.

4. A soldered article according to claim 3, wherein the Cu content in the solder is in the range from about 0.5 to 1.3% by weight.

5. A soldered article according to claim 4, wherein the Cu conductor is a printed circuit board electrode.

6. A soldered article according to claim 4, wherein the Cu conductor is an external terminal of an electronic component.

7. A soldered article according to claim 4, wherein the Cu conductor is an electrode.

8. A soldered article according to claim 7, wherein the Cu electrode is connected to another Cu electrode by said solder.

9. A soldered article according to claim 1, wherein the Cu conductor is a printed circuit board electrode.

10. A soldered article according to claim 1, wherein the Cu conductor is an external terminal of an electronic component.

11. A soldered article according to claim 1, wherein the Cu conductor is an electrode.

12. A soldered article according to claim 11, wherein the Cu electrode is connected to another Cu electrode by said solder.

13. A soldered article according to claim 1, wherein said soldered contains a trace amount of an additive for improving characteristics selected from the group consisting of Ge, P and Ga.

14. A soldered article according to claim 4, wherein said soldered contains a trace amount of an additive for improving characteristics selected from the group consisting of Ge, P and Ga.

* * * * *